(12) United States Patent
Hayashi

(10) Patent No.: US 7,298,389 B2
(45) Date of Patent: Nov. 20, 2007

(54) METHOD AND APPARATUS FOR DRAWING VISIBLE IMAGE ON OPTICAL DISK BY VIBRATING LASER BEAM FOCUS

(75) Inventor: Toyofumi Hayashi, Hamamatsu (JP)

(73) Assignee: Yamaha Corporation (JP)

( * ) Notice: Subject to any disclaimer, the term of this patent is extended or adjusted under 35 U.S.C. 154(b) by 70 days.

(21) Appl. No.: 11/228,166

(22) Filed: Sep. 16, 2005

(65) Prior Publication Data
US 2006/0066714 A1    Mar. 30, 2006

(30) Foreign Application Priority Data
Sep. 17, 2004    (JP) ............................. 2004-270948

(51) Int. Cl.
*B41J 2/47* (2006.01)
(52) U.S. Cl. .................. 347/225; 347/224; 347/248; 347/256; 347/262
(58) Field of Classification Search ................ 347/224, 347/225
See application file for complete search history.

(56) References Cited

U.S. PATENT DOCUMENTS

| | | | | |
|---|---|---|---|---|
| 3,622,742 A | * | 11/1971 | Cohen et al. ............ | 219/121.6 |
| 5,289,450 A | * | 2/1994 | Mizumoto et al. ....... | 369/53.37 |
| 5,568,458 A | * | 10/1996 | Tani et al. ............... | 369/44.35 |
| 5,768,227 A | * | 6/1998 | Baba ....................... | 369/44.28 |
| 5,805,543 A | * | 9/1998 | Takamine et al. ........ | 369/44.32 |
| 5,878,005 A | * | 3/1999 | Tonegawa et al. ....... | 369/44.27 |
| 7,015,939 B2 | * | 3/2006 | Honda et al. ............ | 347/225 |
| 7,145,842 B2 | * | 12/2006 | Kobayashi ............... | 369/44.11 |
| 7,158,452 B2 | * | 1/2007 | Ishibashi et al. ......... | 369/44.29 |
| 2001/0040867 A1 | * | 11/2001 | Onodera et al. ......... | 369/292 |

(Continued)

FOREIGN PATENT DOCUMENTS

JP    2001-283470 A    10/2001

(Continued)

OTHER PUBLICATIONS

Hewlett-Packard showcasing at CES 2004, LightScribe Direct Disc Labeling, News Advisory, Jan. 2004, http://www.hp.com/hpinfo/newsroom/press_kits/2004/ces/fs_lightscribe.pdf.

(Continued)

*Primary Examiner*—Lamson Nguyen
*Assistant Examiner*—Justin Seo
(74) *Attorney, Agent, or Firm*—Rossi, Kimms & McDowell LLP

(57) ABSTRACT

A method and an apparatus for drawing a visible image on an optical disk incorporate an optical pickup, which irradiates an optical beam onto the optical disk through its objective lens. The optical disk, which has a target layer on which the drawing is to be performed, is rotated while applying an oscillation signal to a focus actuator of the optical pickup to thereby vibrate the objective lens in an optical-axis direction thereof so that the focus point of the optical beam recurrently passes through the target layer of the optical disk. The power of the optical beam is controlled to form a recording spot on the target layer each time the focus point of the optical beam passes through the target layer so that a visible light property of the target layer is changed to thereby perform the drawing on the target layer.

28 Claims, 5 Drawing Sheets

U.S. PATENT DOCUMENTS

| | | | |
|---|---|---|---|
| 2002/0191517 A1* | 12/2002 | Honda et al. | 369/53.29 |
| 2003/0117932 A1 | 6/2003 | Morishima et al. | |
| 2004/0224041 A1 | 11/2004 | Morishima | |

FOREIGN PATENT DOCUMENTS

| | | |
|---|---|---|
| JP | 2002-203321 A | 7/2002 |
| JP | 2002351096 A * | 12/2002 |

OTHER PUBLICATIONS

Hewlett-Packard showcasing at CES 2004, LightScribe Direct Disc Labeling, Backgrounder, Jan. 2004, http://www.hp.com/hpinfo/newsroom/press_kits/2004/ces/bg_lightScribe_technology.pdf.

* cited by examiner

METHOD AND APPARATUS FOR DRAWING VISIBLE IMAGE ON OPTICAL DISK BY VIBRATING LASER BEAM FOCUS

BACKGROUND OF THE INVENTION

1. Field of the Invention

This invention relates to a method of performing drawing on a target layer (a data recording layer, a print layer such as a photosensitive layer or a heat-sensitive layer provided on a label side, or the like) of a recordable optical disk and an optical disk recording apparatus for carrying out such a method.

2. Description of Related Art

As a technique of drawing an image of an optional picture or character or the like by irradiating a laser beam onto a data recording layer of a recordable optical disk to thereby change visible light properties of the data recording layer, there is one method as described in, for example, Unexamined Japanese Patent Publication No. 2001-283470.

As a technique of drawing an image of an optional picture or character or the like by forming a print layer such as a photosensitive layer or a heat-sensitive layer on a label side of a recordable optical disk and irradiating a laser beam onto the label side of the disk to thereby change visible light properties of the print layer, there is one method as described in, for example, Unexamined Japanese Patent Publication No. 2002-203321.

The foregoing patent publications each disclose, mainly, a method of performing drawing while precisely executing a focus control. However, in the method of performing the drawing on the print layer of the label side, it may occur that the focus servo is not effectively performed with respect to the print layer depending on a structure or material of the print layer, hence the drawing is disabled. Further, also in the method of performing the drawing on the data recording layer, it may occur that the focus servo is not effectively performed with respect to the data recording layer depending on the disk so that the drawing is disabled.

SUMMARY OF THE INVENTION

This invention has been made in view of the foregoing points and provides a drawing method that can perform drawing without executing a focus control and an optical disk recording apparatus for carrying out such a method.

An inventive method is designed for drawing a visible image on an optical disk recordable by means of an optical pickup which irradiates an optical beam onto the optical disk through an objective lens of the optical pickup. The inventive method is carried out by the steps of: rotating the optical disk having a target layer on which the drawing is to be performed; applying an oscillation signal to a focus actuator of the optical pickup to thereby vibrate the objective lens in an optical-axis direction thereof so that a focus point of the optical beam recurrently passes through the target layer of the optical disk; and controlling a power of the optical beam to form a recording spot on the target layer each time the focus point of the optical beam passes through the target layer so that a visible light property of the target layer is changed to thereby perform the drawing on the target layer.

During the controlling step the power of the optical beam is increased to a level capable of forming the recording spot when the optical beam traveling along a circumferential direction of the rotating optical disk reaches a region of the optical disk where the visible image is to be drawn, and decreases the power of the optical beam to another level incapable of forming the recording spot when the optical beam traveling along the circumferential direction of the rotating optical disk reaches another region where the visible image is not to be drawn. The oscillation signal to the focus actuator is stopped when the optical beam reaches the another region where the visible image is not to be drawn.

While the visible image is being drawn, both the focusing servo control and the tracking servo control of the optical pickup are stopped, i.e., inhibited, and a driving signal obtained by superimposing the oscillation signal to a DC signal having a predetermined DC level effective to cause the focus point to position around the target layer is applied to the focus actuator. Alternatively, while the visible image is being drawn, both the focusing control and the tracking control of the optical pickup are stopped, and a driving signal obtained by superimposing the oscillation signal to a signal having a varying amplitude effective to cause the focus point to follow level swinging of the target layer during the rotation of the optical disk is applied to the focus actuator.

An inventive apparatus is provided for drawing a visible image on an optical disk having a target layer on which the visible image is to be drawn with an optical beam. The apparatus comprises a spindle motor that rotationally drives the optical disk, an optical pickup that has a focus actuator and an objective lens driven by the focus actuator for irradiating the optical beam onto the optical disk through the objective lens, an oscillation signal generator that generates an oscillation signal to be applied to the focus actuator of the optical pickup. The oscillation signal is applied to the focus actuator while the optical disk is rotated by the spindle motor to oscillate the objective lens in an optical-axis direction thereof so that a focus point of the optical beam recurrently passes through the target layer of the optical disk. The apparatus further includes a controller that controls the optical pickup to form a recording spot on the target layer each time the focus point of the optical beam passes through the target layer so that a visible light property of the target layer is changed to thereby draw the visible image on the target layer.

In another aspect, the apparatus comprises a spindle motor that rotationally drives the optical disk having the target layer on which the drawing of the visible image is to be performed, an optical pickup that has a focus actuator and an objective lens driven by the focus actuator for irradiating the optical beam onto the optical disk through the objective lens, a feed device that feeds the optical pickup in a radial direction of the optical disk, a circumferential position detector that detects a circumferential position of the optical beam with respect to the optical disk, a radial position detector that detects a radial position of the optical beam with respect to the optical disk, an oscillation signal generator that generates an oscillation signal to be applied to the focus actuator of the optical pickup, an image data output device that outputs the image data representing the visible image to be drawn on the optical disk, and a controller that applies the oscillation signal to the focus actuator of the optical pickup while rotating the optical disk to thereby cause a focus point of the optical beam to recurrently pass through the target layer of the optical disk. The controller controls the power of the optical beam according to the image data while the circumferential position detector detects the circumferential position of the optical beam and the radial position detector detects the radial position of the optical beam with respect to the optical disk so that the power of the optical beam is increased to a level capable of forming a recording spot upon occurrence of the focus point passing the target layer when the optical beam traveling along a circumferential direction of the rotating optical disk reaches a region of the optical disk where the visible image is to be drawn, and the power of the optical beam is decreased to another level incapable of forming the recording spot when the optical beam traveling along the circumferential direction of the rotating optical disk reaches another region where the visible image is not to be drawn. The controller controls the feed device to sequentially feed the optical pickup in the radial direction of the optical disk to change a visible light property of the target layer by forming the recording spots, thereby forming the visible image on the target layer.

An oscillation signal is applied to a focus actuator of an optical pickup to cause an energy high-density portion of an optical beam (i.e., focus point of the optical beam) to recurrently pass through a target layer of an optical disk to form a recording spot upon the energy high-density portion passing therethrough. Therefore, the visible image can be drawn even when a focus servo cannot be effectively performed.

DETAILED DESCRIPTION OF THE INVENTION

Embodiment 1

Figure 1:
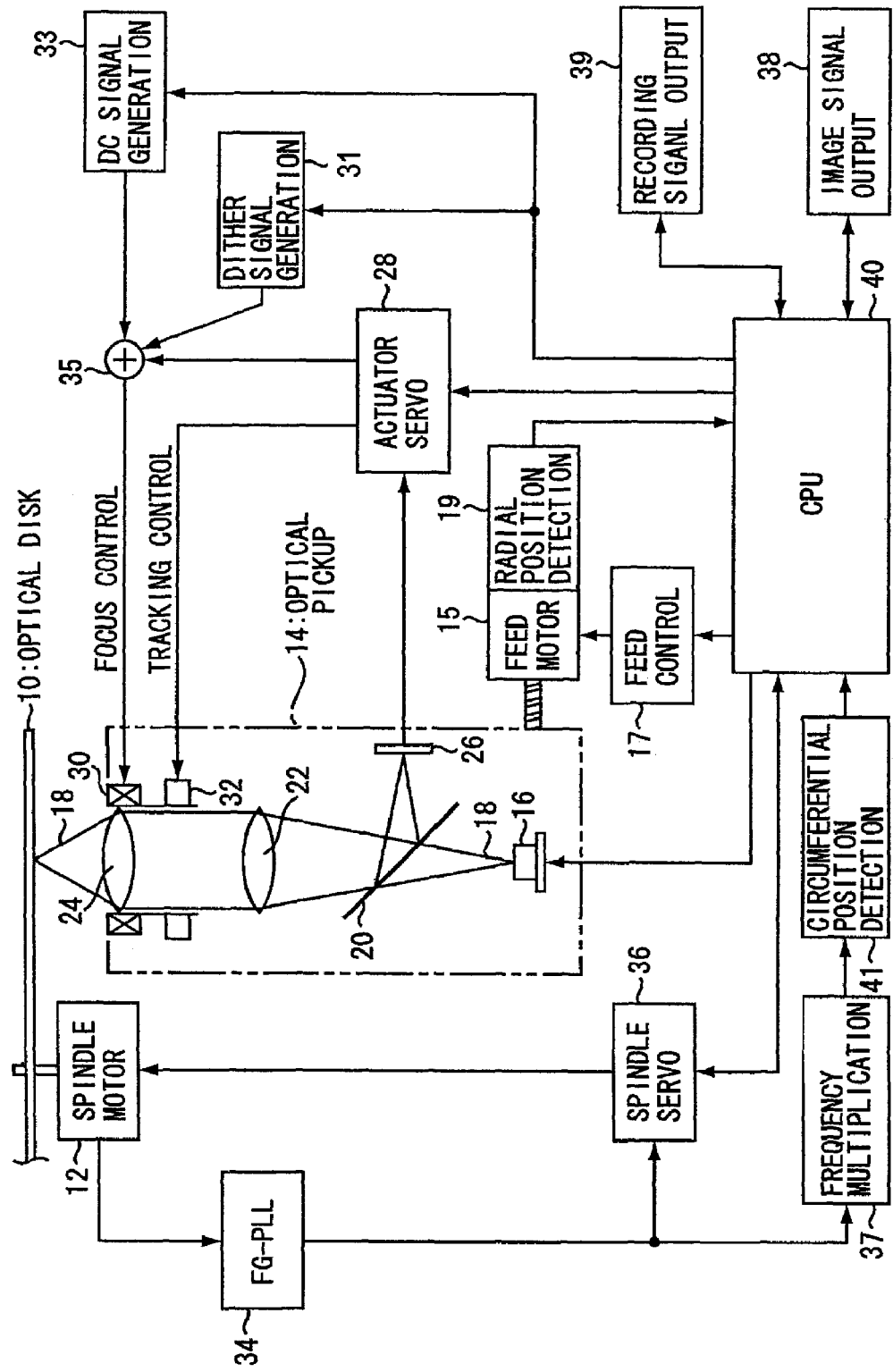
FIG. 1 is a block diagram showing an embodiment of an optical disk recording apparatus of this invention.

An embodiment of this invention will be described. In this embodiment, description will be given of a case where drawing is performed on a data recording layer. FIG. 1 shows an optical disk recording apparatus having a drawing function according to this invention. This optical disk recording apparatus can perform recording with respect to an optical disk, such as a CD-R, CD-RW, DVD-R, DVD+RW, DVD-RW, or DVD-RAM, whose visible light properties change by the recording and, in addition to normal information recording and reproduction, the apparatus can perform drawing according to this invention. An optical disk 10 is the foregoing type that changes in visible light properties by the recording. The optical disk 10 is mounted on a turntable with its label side facing upward, i.e. mounted with its recording side facing an optical pickup 14, rotationally driven by a spindle motor 12, and subjected to information recording, reproduction, or drawing by the use of the optical pickup 14.

The optical pickup 14 is moved in a radial direction of the optical disk 10 by a feed motor 15. A feed control circuit 17 controls the feed motor 15. A position of the optical pickup 14 in the disk radial direction is detected by a radial position detector 19. The radial position detector 19 can be configured to measure a rotation amount of the feed motor 15 from a home position of the optical pickup 14 detected by, for example, a limit switch to thereby derive a position of the optical pickup 14 in the disk radial direction. In the optical pickup 14, a laser beam 18 emitted from a laser diode 16 passes through a beam splitter 20 and is shaped in a beam shape having a true circle section by a collimator lens 22 and focused by an objective lens 24 so as to condense in energy density, thereby being irradiated onto a data recording layer of the optical disk 10. Return light that may be reflected from the optical disk 10 can be further reflected by the beam splitter 20 through the objective lens 24 and the collimator lens 22 so as to be received on a photodiode (a quadrant photodiode or the like) 26.

At the time of information recording and reproduction, an actuator servo circuit 28 detects a focus error based on a received light signal from the photodiode 26 and drives a focus actuator 30 so as to cancel the focus error, thereby executing a focus servo control. Further, at the time of information recording and reproduction, the actuator servo circuit 28 detects a tracking error based on a received light signal from the photodiode 26 and drives a tracking actuator 32 so as to cancel the tracking error, thereby executing a tracking servo control. At the time of drawing, the focus control and the tracking control by the actuator servo circuit 28 are stopped.

At the time of drawing, a dither signal generating circuit 31 outputs a dither signal (oscillation signal) in the form of a predetermined-waveform periodical signal. At the time of drawing, a DC signal generating circuit (DC signal generator) 33 outputs a DC signal of a predetermined level for causing a focus point to approach around a position of the data recording layer. The DC signal of a voltage level establishes a working distance between confronting surfaces of the objective lens 24 and the optical disk 10 determined with respect to the optical pickup 14 to be used. At the time of drawing, these dither signal and DC signal are added together by an adder 35 and applied to the focus actuator 30 to thereby vibrate the objective lens 24 in its optical-axis direction with respect to a neutral position that is set by the foregoing DC signal.

The optimal amplitude of the dither signal that is outputted from the dither signal generating circuit 31 may be determined based on the linear velocity of the disk, i.e. the lateral relative moving velocity, the frequency of the dither signal, i.e. the longitudinal relative moving velocity, the laser power, i.e. the range of a high energy density portion that can form a recording spot or drawing dot, and the sensitivity of the data recording layer. It is preferable to consider properties of dot formation due to preheating after the drawing (properties of drawing dot enlargement by preheating). It is more preferable to consider warping of the optical disk and so on. When considering the warping, the amplitude is, for example, set to a magnitude that can vibrate the objective lens 24 with an amplitude greater than a tolerance of face runout of the optical disk 10 (±0.5 mm in the case of a CD-standard disk and ±0.3 mm in the case of a DVD-standard disk). By this, when the face runout of the optical disk 10 falls substantially within the tolerance, the focus point of the laser beam 18 emitted from the objective lens 24 can pass through the data recording layer (i.e. can be instantaneously focused on the data recording layer) by the vibration of the objective lens 24. Accordingly, a recording spot can be formed on the data recording layer by the high energy density upon passing through the data recording layer (being focused on the data recording layer) to change the visible light properties of the data recording layer, thereby performing the drawing on the data recording layer. At the timing when the focus point of the laser beam 18 is deviated from the data recording layer (i.e. not focused on the data recording layer), the spot diameter of the laser beam at the position of the data recording layer largely expands to reduce its energy density and therefore the recording spot is not formed.

An FG-PLL circuit 34 produces a pulse signal synchronous with an FG (frequency generator) signal that is outputted from the spindle motor 12 per predetermined rotation angle. At the time of data recording, a spindle servo circuit 36 controls the spindle motor 12 to maintain a constant linear velocity so that a disk wobble signal detected from a received light signal of the photodiode 26 can be detected at a predetermined frequency. Alternatively, the spindle servo circuit 36 controls the spindle motor 12 to maintain a constant rotational velocity so that an FG-synchronous pulse signal outputted from the FG-PLL circuit 34 can be detected at a predetermined frequency. On the other hand, at the time of data reproduction, the spindle servo circuit 36 controls the spindle motor 12 to maintain a constant linear velocity so that a disk wobble signal detected from a received light signal of the photodiode 26 can be detected at a predetermined frequency, or a clock signal reproduced from a received light signal (RF signal) of the photodiode 26 can be detected at a predetermined frequency. Alternatively, the spindle servo circuit 36 controls the spindle motor 12 to maintain a constant rotational velocity so that an FG-synchronous pulse signal outputted from the FG-PLL circuit 34 can be detected at a predetermined frequency. On the other hand, at the time of drawing, the spindle servo circuit 36 controls the spindle motor 12 to keep a constant rotational velocity so that an FG-synchronous pulse signal outputted from the FG-PLL circuit 34 can be detected at a predetermined frequency.

A frequency multiplier 37 multiplies the frequency of an FG-synchronous pulse signal outputted from the FG-PLL circuit 34. A circumferential position detector 41 counts the frequency-multiplied FG-synchronous pulse signal to thereby detect a disk circumferential position (relative position with respect to a given reference position). At the time of drawing, an image signal output circuit 38 outputs an image signal representing a visible image to be drawn. At the time of information recording, a recording signal output circuit 39 outputs recording signal data. A CPU 40 controls the respective portions of this optical disk recording apparatus.

Description will be given of a control at the time of normal data recording of the optical disk recording apparatus of FIG. 1. The CPU 40 applies a predetermined modulation process to the recording signal data outputted from the recording signal output circuit 39 to thereby produce a recording signal. A laser beam 18 emitted from the laser diode 16 is modulated by this recording signal and focused on the data recording layer of the optical disk 10 to cause a change in the data recording layer, thereby recording such a recording signal. In this event, a focus control and a tracking control are executed by the actuator servo circuit 28, a feed control of the optical pickup 14 is executed by the feed control circuit 17, and a rotation control of the optical disk 10 is executed by the spindle servo circuit 36.

Description will be given of a control at the time of normal data reproduction of the optical disk recording apparatus of FIG. 1. A reproducing-power laser beam 18 is emitted from the laser diode 16 and irradiated onto the data recording layer of the optical disk 10. Return light from the optical disk 10 is received by the photodiode 26 and data is demodulated from a received light signal thereof. In this event, a focus control and a tracking control are executed by the actuator servo circuit 28, a feed control of the optical pickup 14 is executed by the feed control circuit 17, and a rotation control of the optical disk 10 is executed by the spindle servo circuit 36.

Description will be given of a control at the time of drawing of the optical disk recording apparatus of FIG. 1. At the time of drawing, the optical disk 10 is mounted on the turntable with its label side facing upward like at the time of data recording and at the time of data reproduction. The rotational velocity of the spindle motor 12 is controlled constant by the control of the spindle servo circuit 36 on the basis of output pulses from the FG-PLL circuit 34. The focus control and the tracking control by the actuator servo circuit 28 are stopped and a signal obtained by adding together a dither signal outputted from the dither signal generating circuit 31 and a DC signal outputted from the DC signal generating circuit 33 is applied to the focus actuator 30 so that the objective lens 24 vibrates in its optical-axis direction. The feed control circuit 17 continuously drives the feed motor 15 at a constant velocity or drives the feed motor 15 in a stepwise fashion (i.e. intermittently) by a predetermined amount per revolution to thereby move the optical pickup 14 in a direction from the inner peripheral side toward the outer peripheral side of the disk or in a direction opposite thereto. In this event, the position of the optical pickup 14 in the disk radial direction is detected by the radial position detector 19 and this detected information is sent to the CPU 40. On the other hand, the circumferential position detector 41 counts a pulse signal, obtained by multiplying the frequency of the FG-synchronous pulse signal, outputted from the frequency multiplier 37 to thereby detect a relative position with respect to a given reference position of the optical pickup 14 in the disk circumferential direction. Depending on the position in the disk radial direction and the position in the disk circumferential direction detected with respect to the optical pickup 14, the CPU 40 sequentially reads an image signal {a binary signal (FIG. 3(*a*), FIG. 4(*a*))} to be recorded at the pertinent position, from the image signal output circuit 38. A laser beam 18 emitted from the laser diode 16 is modulated by this image signal. A focus point of the laser beam 18 emitted from the objective lens 24 recurrently passes through the data recording layer of the optical disk 10 due to vibration of the objective lens 24 and, upon every occurrence of passing therethrough, forms a recording spot on the data recording layer due to high energy density at the time of passing therethrough to thereby change the visible light properties of the data recording layer, thereby performing drawing on the data recording layer. The drawing is continuously performed with respect to one disk and is finished by one time. In the case of performing the drawing at a constant rotational velocity, the linear velocity increases as approaching the outer periphery of the disk. Therefore, by increasing the frequency of the dither signal and the recording power as the linear velocity increases, constant recording spots can be formed regardless of the position in the disk radial direction.

Figure 2:
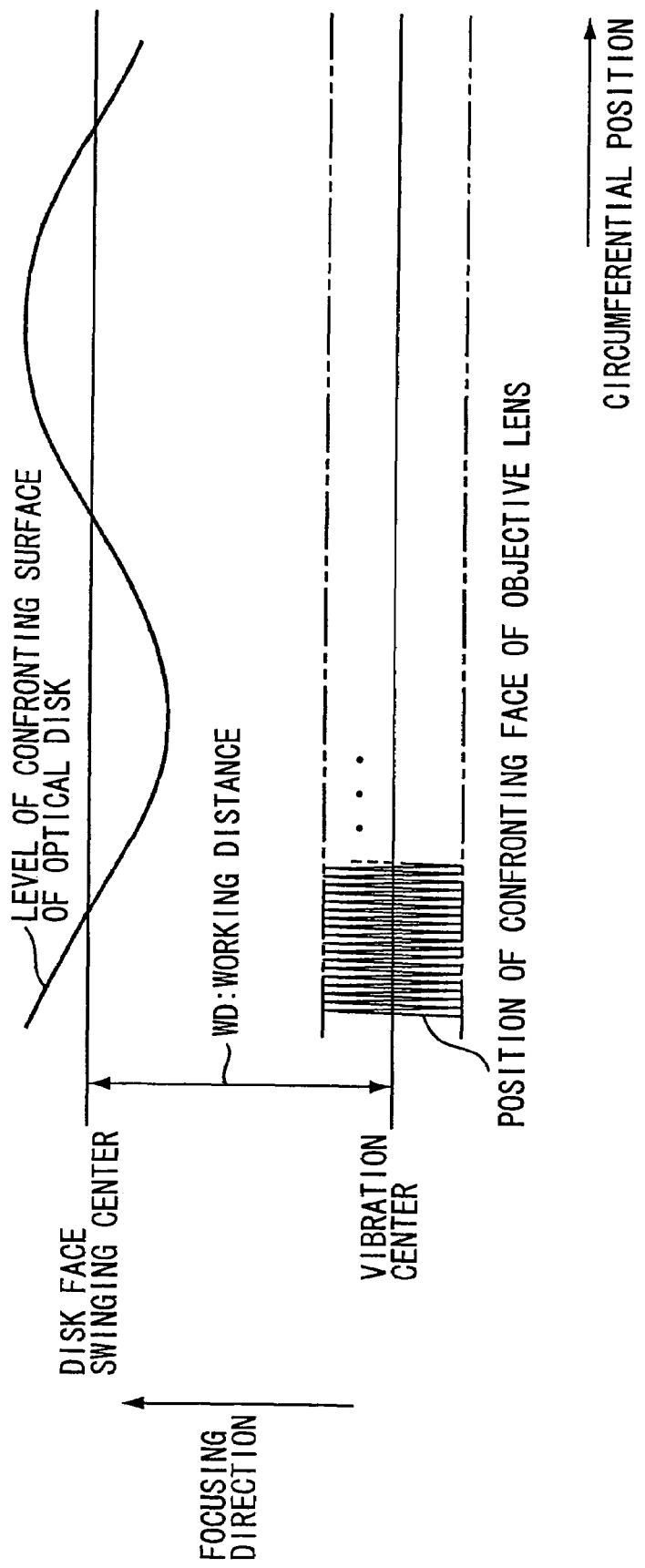
FIG. 2 is a diagram showing changes in positions of confronting surfaces of an objective lens 24 and an optical disk 10 at the time of drawing in an embodiment 1.

FIG. 2 shows changes in positions (positions in focus directions, i.e. positions in the optical-axis direction of the objective lens 24) of confronting surfaces of the objective lens 24 and the optical disk 10 at the time of drawing. The confronting surface of the optical disk 10 is swinging in the focus direction at a low speed due to face runout. The confronting surface of the objective lens 24 is vibrating in the focus directions at a high speed due to the dither signal. By setting the DC signal outputted from the DC signal generating circuit 33 to a value that establishes a predetermined working distance WD (e.g. 1.7 mm or the like) determined with respect to the optical pickup 14 that is used and by setting the amplitude of the dither signal to a value greater than a tolerance of the face runout of the optical disk 10, when the face runout of the optical disk 10 falls substantially within the tolerance, it is possible to achieve a focused state where a focus point passes through the data recording layer per half period of the dither signal.

Figure 3:
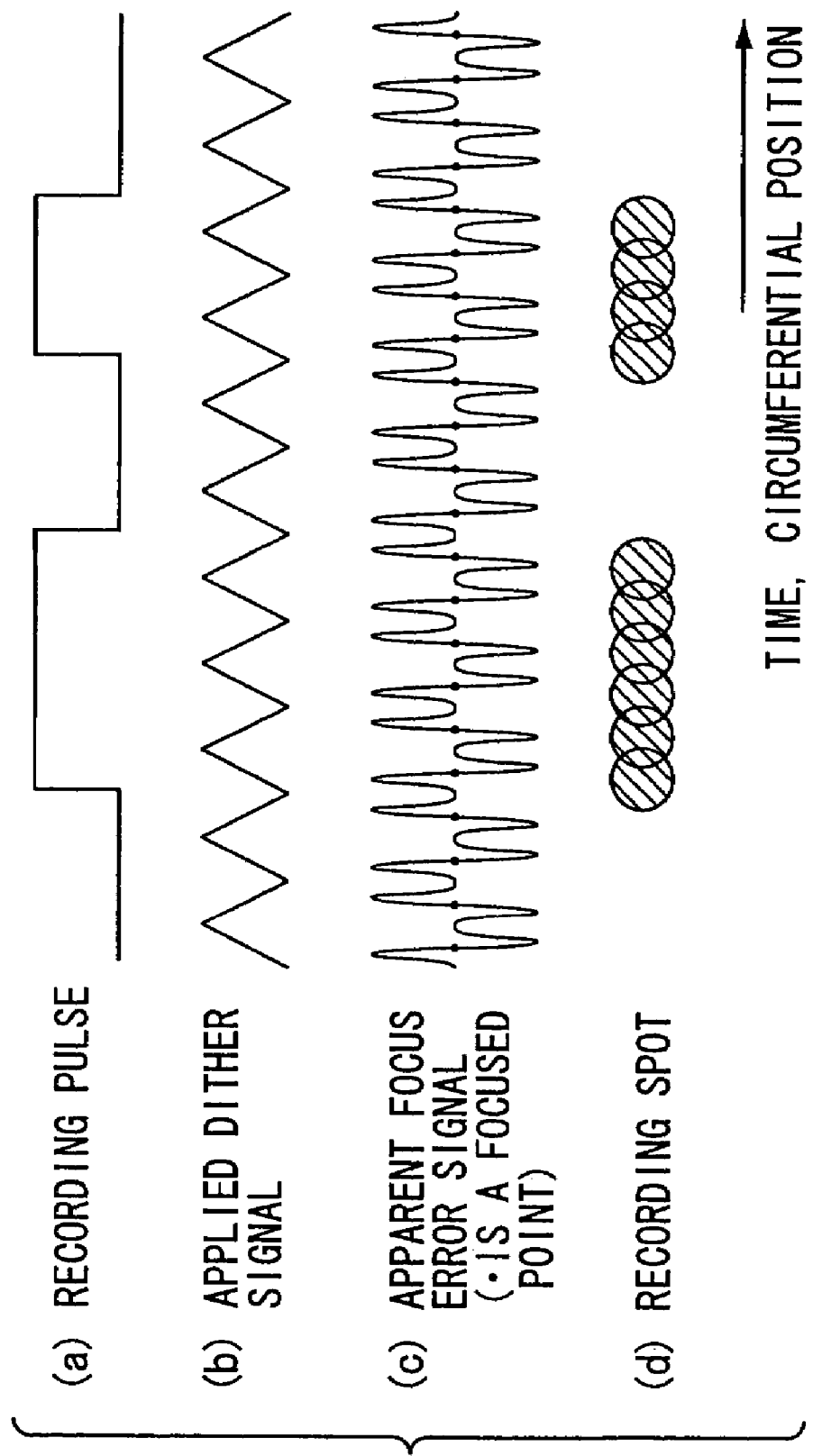
FIG. 3 is a diagram showing one example of signal waveforms at the time of drawing in the optical disk recording apparatus of FIG. 1 and the shape of a recording spot formed on a data recording layer.

FIG. 3 shows one example of signal waveforms at the time of drawing and the shape of a recording spot formed on the data recording layer. (a) is recording pulses for drawing outputted from the recording signal output circuit 39, and the power of the laser beam 18 emitted from the laser diode 16 is modulated depending on a pulse waveform thereof. Specifically, the power of the laser beam 18 is increased to a recording power {the power that generates a change on the data recording layer (i.e. forms a drawing dot)} at the timing of a high level of the pulse waveform while decreased to as a non-recording power (reproducing power) at the timing of a low level. (b) is a dither signal outputted from the dither signal generating circuit 31. Herein, the case is shown where a triangular wave having a predetermined period and a predetermined amplitude is used as the dither signal. This dither signal is added to a DC signal outputted from the DC signal generating circuit 33 and applied to the focus actuator 30, thereby vibrating the objective lens 24 in the focus direction. (c) is a focus error signal that may be obtained in this event. Because of the application of the dither signal to the focus actuator 30, so-called S-curves are recurrently appearing in the apparent focus error signal. Each black circle (•) is a focused position (timing when the focus point passes through the data recording layer). (d) shows recording spots (drawing dots) formed on the data recording layer. That is, the recording spot is formed in a predetermined size at the timing of each focused position in the duration of the high level of each recording pulse of (a). The relationship among the laser power, the frequency of the dither signal, and the rotational velocity of the optical disk is set so that the recording spots are mutually overlapped together. Specifically, as the relative moving velocity between the data recording layer and the laser focused position is reduced in a longitudinal direction (direction perpendicular to the disk surface) and in a lateral direction (circumferential direction), the recording spots become easier to overlap together. That is, as the relative moving velocity between the data recording layer and the laser focused position is reduced in the longitudinal direction, a time during which the laser focused position is passing through the data recording layer is prolonged to increase the heat input amount and therefore the diameter of each recording spot increases so that the adjacent recording spots become easier to join together. Further, as the relative moving velocity between the data recording layer and the laser focused position is reduced in the lateral direction, the distance between the centers of the adjacent recording spots is shortened so that the adjacent recording spots become easier to join together. Specifically, with respect to the rotational velocity of the optical disk, as the rotation velocity decreases, the relative moving velocity between the data recording layer and the laser focus point decreases in the lateral direction so that the adjacent recording spots become easier to join together. On the other hand, with respect to the frequency of the dither signal, as the frequency decreases, the relative moving velocity between the data recording layer and the laser focused position decreases in the longitudinal direction to thereby increase the recording spot diameter, which causes a tendency to make the adjacent recording spots easily join together. However, as the frequency decreases, the period of focusing on the data recording layer is prolonged to increase a distance between the centers of the adjacent recording spots, which causes a tendency to separate the adjacent recording spots away from each other. Therefore, with respect to the frequency of the dither signal, the easiness of joining between the recording spots is not necessarily determined uniquely depending on the magnitude of the frequency, but changes depending on the balance between the foregoing both tendencies. Conversely to the foregoing, it is possible to perform drawing so that the recording spots are not mutually joined together.

Figure 4:
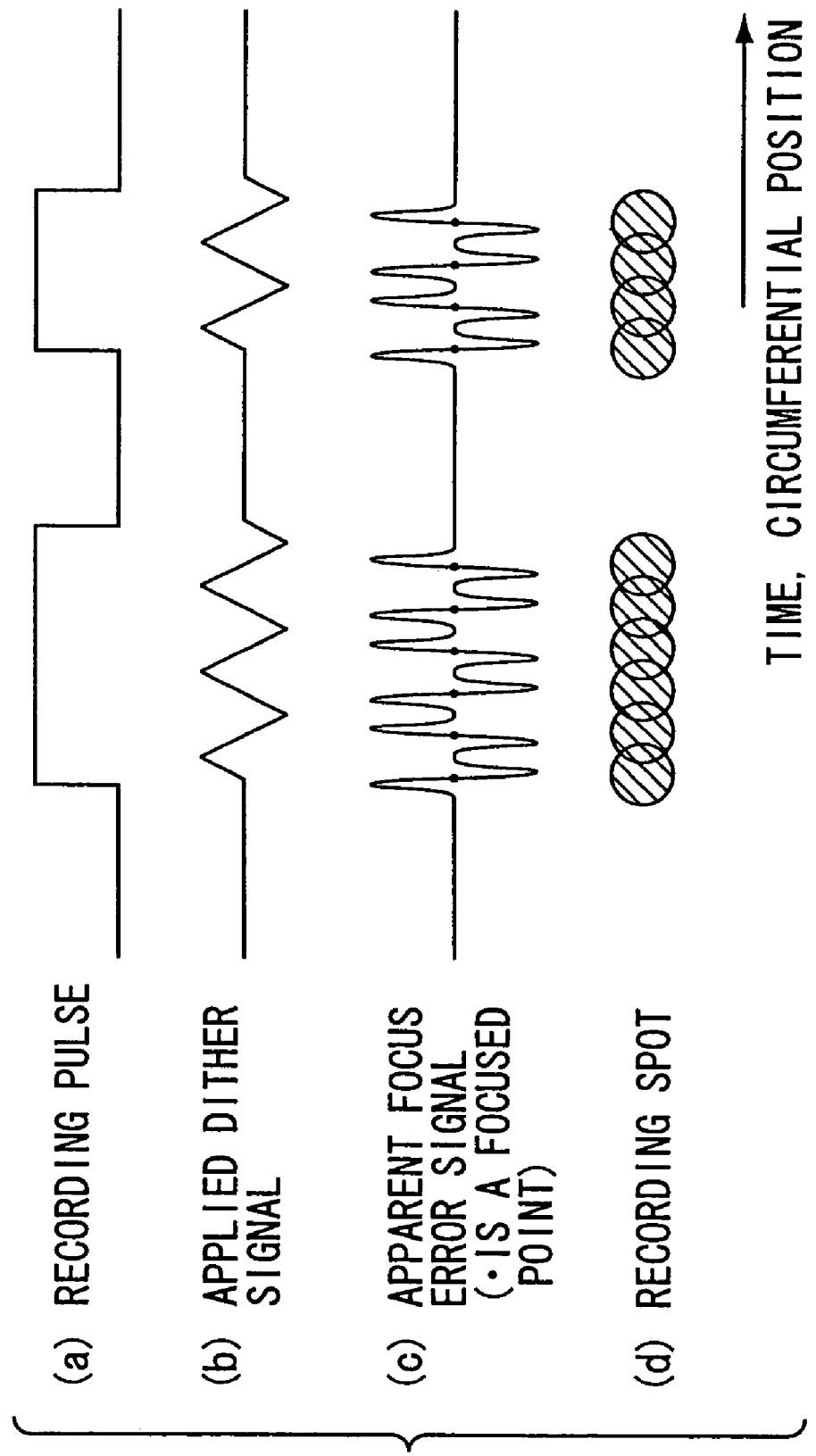
FIG. 4 is a diagram showing another example of signal waveforms at the time of drawing in the optical disk recording apparatus of FIG. 1 and one example of the shape of a recording spot formed on a data recording layer.

In the example of FIG. 3, the dither signal is continuously applied to the focus actuator. However, as shown in FIG. 4, the dither signal may be applied to the focus actuator only in the duration of each recording pulse (i.e. only in the duration when the laser beam 18 passes each region of the optical disk 10 where drawing is performed).

Embodiment 2

Another embodiment of this invention will be described. In this embodiment, drawing is performed on a data recording layer by vibrating an objective lens while making it roughly follow face runout of an optical disk. As a structure of an optical disk recording apparatus, it can be configured such that there is added in FIG. 1, instead of the DC signal generating circuit 33, a device (face runout following signal generating device) that generates a signal (face runout following signal) roughly following the face runout of the optical disk. As the face runout following signal generating device, use can be made of, for example, a device that measures, at a position where a laser beam 18 is irradiated onto an optical disk 10, an amount of displacement of the disk surface in an optical-axis direction of the laser beam 18 by the use of an optical technique, a mechanical technique, or the like. Controls at the time of normal data recording and at the time of normal data reproduction are the same as those described in the embodiment 1. At the time of drawing, the spindle motor 12 is controlled to maintain a constant rotational velocity under the control of the spindle servo circuit 36 on the basis of output pulses from the FG-PLL circuit 34. The tracking control and the focus control by the actuator servo circuit 28 are stopped. A face runout following signal generated from the face runout following signal generating device and a dither signal outputted from the dither signal generating circuit 31 are added together by the adder 35 and applied to the focus actuator 30. By this, the objective lens 24 vibrates in the optical-axis direction while roughly following the disk face runout. The feed control circuit 17 continuously drives the feed motor 15 at a constant velocity or drives the feed motor 15 in a stepwise fashion (i.e. intermittently) by a predetermined amount per revolution to thereby move the optical pickup 14 in a direction from the inner peripheral side toward the outer peripheral side of the disk or in a direction opposite thereto. In this event, the position of the optical pickup 14 in the disk radial direction is detected by the radial position detector 19 and this detected information is sent to the CPU 40. On the other hand, the circumferential position detector 41 counts a pulse signal, obtained by multiplying the frequency of the FG-synchronous pulse signal, outputted from the frequency multiplier 37 to thereby detect a position (relative position with respect to a reference position) of the optical pickup 14 in the disk circumferential direction. Depending on the position in the disk radial direction and the position in the disk circumferential direction detected with respect to the optical pickup 14, the CPU 40 sequentially reads an image signal {a binary signal (FIG. 3(*a*), FIG. 4(*a*))} to be recorded at a pertinent region, from the image signal output circuit 38. A laser beam 18 emitted from the laser diode 16 is modulated by this image signal. A focus point of the laser beam 18 emitted from the objective lens 24 recurrently passes across the data recording layer of the optical disk 10 due to vibration of the objective lens 24 and, upon every occurrence of coincidence between the focus point and the target layer, forms a recording spot on the data recording layer due to high energy density at the time of the coincidence to change the visible light properties of the data recording layer, thereby performing drawing on the data recording layer. In the case of performing the drawing at a constant rotational velocity, the linear velocity increases as approaching the outer periphery of the disk. Therefore, by increasing the frequency of the dither signal and the recording power as the linear velocity increases, constant recording spots can be formed regardless of the position in the disk radial direction.

Figure 5:
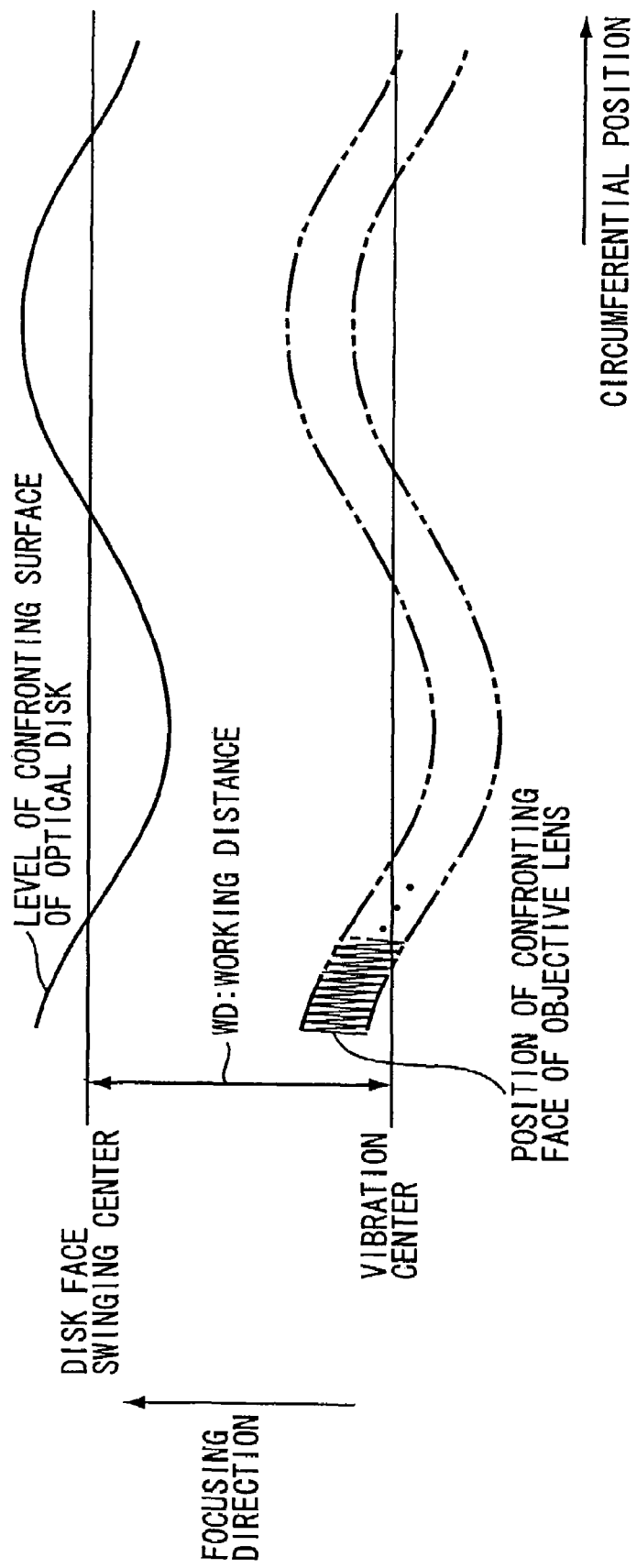
FIG. 5 is a diagram showing changes in positions of confronting surfaces of an objective lens 24 and an optical disk 10 at the time of drawing in an embodiment 2.

FIG. 5 shows changes in positions (positions in the focus directions, i.e. positions in the optical disk irradiation-axis direction) of the confronting surfaces of the objective lens 24 and the optical disk 10 at the time of drawing. The confronting surface of the optical disk 10 is swinging in the focus direction at a low speed due to the face runout. The confronting surface of the objective lens 24 is vibrating in the focus directions at a high speed due to the dither signal while roughly following the disk face runout. By the application of the face runout following signal, a predetermined working distance WD determined with respect to the optical pickup 14 is substantially realized. According to this embodiment, since the confronting surface of the objective lens 24 roughly follows the disk face runout, it is possible to achieve a focused state (state where the focus point passes through the data recording layer) per half period of the dither signal even if the amplitude of the dither signal is relatively small.

Embodiment 3

Still another embodiment of this invention will be described. In this embodiment, an image of an optional picture or character or the like is drawn by previously forming a print layer such as a photosensitive layer or a heat-sensitive layer on a label side of a recordable optical disk and by irradiating a laser beam onto the label side of the disk to thereby change visible light properties of the print layer. At the time of drawing, an optical disk 10 is mounted upside down (i.e. with its label side facing the optical pickup 14) on the turntable. As a structure of an optical disk recording apparatus, the structure of FIG. 1 can be used. A print layer is formed over the whole surface on the label side of the optical disk 10. When a laser beam of a predetermined or more power is irradiated from the label side, the print layer changes in visible light properties {color (hue, brightness, saturation), spectrum, reflectance, transmittance, light scattering, etc.} from the label side at a portion subjected to the irradiation. The print layer can be formed by, for example, a layer (a photosensitive layer, a heat-sensitive layer, or the like) of a material such as a photosensitive material or a heat-sensitive material that changes in color {e.g. changes from white to non-white (such as black), from transparent to non-transparent (such as black), or the like}. When the print layer is formed by the photosensitive layer, use can be made of, for example, a photosensitive material that is sensitive to a laser beam 18, having a predetermined wavelength and a predetermined or more power, emitted from the optical pickup 14 so as to change the target layer in color. On the other hand, when the print layer is formed by the heat-sensitive layer, use can be made of a heat-sensitive material that is sensitive to a temperature, which is reached only when a laser beam 18 is focused on the print layer at a predetermined or more power, so as to change the target layer in color, but that does not change in color at a temperature lower than that. At the time of data recording, the optical disk 10 is mounted on the turntable with its label side facing upward and a laser beam 18 is almost blocked by a reflection layer disposed behind a recording layer so that the print layer is subjected to no change in color.

At the time of drawing, the DC signal generating circuit (DC signal generator) 33 outputs a DC signal of a predetermined level for causing a focus point to approach a level of the print layer. At the time of drawing, a dither signal and the DC signal are added together by the adder 35 and applied to the focus actuator 30 to thereby vibrate the objective lens 24 in the optical-axis direction with respect to a position that is set by the foregoing DC signal.

Controls at the time of normal data recording and at the time of normal data reproduction are the same as those described in the embodiment 1. At the time of drawing, the optical disk 10 is mounted upside down on the turntable. The control at the time of the drawing is executed in the following manner. Specifically, the spindle motor 12 is controlled to maintain a constant rotational velocity under the control of the spindle servo circuit 36 on the basis of output pulses from the FG-PLL circuit 34. The focus control and the tracking control by the actuator servo circuit 28 are stopped. A signal obtained by adding or superimposing together the dither signal outputted from the dither signal generating circuit 31 and the DC signal outputted from the DC signal generating circuit 33 is applied to the focus actuator 30 so that the objective lens 24 vibrates in its optical-axis direction. The feed control circuit 17 continuously drives the feed motor 15 at a constant velocity or drives the feed motor 15 in a stepped fashion (i.e. intermittently) by a predetermined amount per revolution to thereby move the optical pickup 14 in a direction from the inner peripheral side toward the outer peripheral side of the disk or in a direction opposite thereto. In this event, the position of the optical pickup 14 in the disk radial direction is detected by the radial position detector 19 and this detected information is sent to the CPU 40. On the other hand, the circumferential position detector 41 counts a pulse signal, obtained by multiplying the frequency of the FG-synchronous pulse signal, outputted from the frequency multiplier 37 to thereby detect a position (relative position with respect to a given reference position) of the optical pickup 14 in the disk circumferential direction. Depending on the position in the disk radial direction and the position in the disk circumferential direction detected with respect to the optical pickup 14, the CPU 40 sequentially reads image data {a binary signal (FIG. 3(*a*), FIG. 4(*a*))} to be recorded at a pertinent area of the disk, from the image signal output circuit 38. A laser beam 18 emitted from the laser diode 16 is modulated by this image signal. A focus point of the laser beam 18 emitted from the objective lens 24 recurrently passes through the print layer of the optical disk 10 due to vibration of the objective lens 24 and, upon every occurrence of passing therethrough, generates a recording spot on the print layer due to high energy density at the time of passing therethrough to change the visible light properties of the print layer, thereby performing drawing on the print layer. The drawing is continuously performed with respect to one disk and is finished by one time. In the case of performing the drawing at a constant rotational velocity, the linear velocity increases as approaching the outer periphery. Therefore, by increasing the frequency of the dither signal and the recording power as the linear velocity increases, constant recording spots can be formed regardless of the position in the disk radial direction.

Also in the case of performing the drawing by forming the print layer such as the photosensitive layer or the heat-sensitive layer on the label side of the recordable optical disk and by irradiating a laser beam onto the label side of the disk to thereby change the visible light properties of the print layer, the drawing can be performed on the print layer by adding the face runout following signal generating device in place of the DC signal generating circuit 33 and by vibrating the objective lens 24 in the optical-axis direction while making it roughly follow the disk face runout like in the manner as described in the foregoing embodiment 2.

In each of the foregoing embodiments, the drawing is performed while controlling the optical disk to rotate at the constant rotational velocity. However, the drawing can also be performed by controlling the optical disk to rotate at a constant linear velocity. Further, in each of the foregoing embodiments, the description has been given of the case where the triangular wave is used as the oscillation signal. However, use can also be made of an oscillation signal having a sine wave or another waveform.

What is claimed is:

1. A method of drawing a visible image on an optical disk with an optical pickup having an objective lens and a focus actuator, the optical pickup being adapted to irradiate an optical beam onto the optical disk through the objective lens, a servo controller providing a focusing servo control and a tracking servo control of the optical pickup, the optical disk having a target layer on which the visible image is to be drawn, the method comprising the steps of:

rotating the optical disk;

applying an oscillation signal to the focus actuator of the optical pickup to oscillate the objective lens along an optical-axis direction thereof so that a focus point of the optical beam recurrently passes through the target layer of the optical disk while both the focusing servo control and the tracking servo control of the optical pickup are stopped; and controlling a power of the optical beam to form a recording spot on the target layer each time the focus point of the optical beam passes through the target layer so that a visible light property of the target layer is changed to thereby form the visible image on the target layer while both the focusing servo control and the tracking servo control of the optical pickup are stopped.

2. The method according to claim 1, wherein in the step of controlling the power, the power of the optical beam is increased to a level capable of forming the recording spot when the optical beam traveling along a circumferential direction of the rotating optical disk reaches a region of the optical disk where the visible image is to be drawn, and is decreased to another level incapable of forming the recording spot when the optical beam traveling along the circumferential direction of the rotating optical disk reaches another region where the visible image is not to be drawn.

3. The method according to claim 1, further comprising the step of stopping the oscillation signal applied to the focus actuator when the optical beam reaches the another region where the visible image is not to be drawn.

4. A method of drawing a visible image on an optical disk with an optical pickup having an objective lens and a focus actuator, the optical pickup being adapted to irradiate an optical beam onto the optical disk through the objective lens of the optical pickup, the optical disk having a target layer on which the visible image is to be drawn, the method comprising the steps of:

rotating the optical disk;

generating an oscillation signal for oscillating the objective lens along an optical-axis direction thereof so that a focus point of the optical beam recurrently passes through the target layer of the optical disk;

controlling a power of the optical beam to form a recording spot on the target layer each time the focus point of the optical beam passes through the target layer so that a visible light property of the target layer is changed to thereby form the visible image on the target layer; and applying to the focus actuator a driving signal comprising a first signal and the oscillation signal superimposed to the first signal, wherein the first signal is one of a DC signal or a varying amplitude signal, wherein the DC signal has a predetermined DC level effective to cause the focus point to position around the target layer during the rotation of the optical disk, and wherein the varying amplitude signal has a varying amplitude effective to cause the focus point to follow level swinging of the target layer during the rotation of the optical disk.

5. The method according to claim 4, wherein the driving signal is applied to the focus actuator while the visible image is being drawn on the target layer.

6. The method according to claim 5, wherein a focusing servo control and a tracking servo control are provided for the optical pickup to accurately control the position of the focus point of the optical beam relative to the optical disk, and wherein both the focusing servo control and the tracking servo control of the optical pickup are stopped while the driving signal is applied to the focus actuator.

7. The method according to claim 4, wherein the target layer is a data recording layer and the visible image is formable on the data recording layer.

8. The method according to claim 4, wherein the target layer is on a label side of the optical disk, opposite to a data recording side of the optical disk.

9. The method according to claim 8, wherein the target layer on the label side is one of a photosensitive layer or a heat-sensitive layer.

10. An apparatus for drawing a visible image on an optical disk having a target layer on which the visible image is to be drawn with an optical beam, the apparatus comprising:

a spindle motor that rotationally drives the optical disk;

an optical pickup that has a focus actuator and an objective lens driven by the focus actuator for irradiating the optical beam onto the optical disk through the objective lens;

a servo controller that provides a focusing servo control and a tracking servo control of the optical pickup;

an oscillation signal generator that generates an oscillation signal to be applied to the focus actuator of the optical pickup while the optical disk is being rotated by the spindle motor to oscillate the objective lens in an optical-axis direction thereof so that a focus point of the optical beam recurrently passes through the target layer of the optical disk; and a controller that controls the optical pickup to form a recording spot on the target layer each time the focus point of the optical beam passes through the target layer so that a visible light property of the target layer is changed to thereby form the visible image on the target layer, wherein both the focusing servo control and the tracking servo control of the optical pickup are stopped while the visible image is being drawn on the target layer.

11. An apparatus for drawing a visible image on an optical disk having a target layer on which the visible image is to be drawn with an optical beam, the apparatus comprising:

an optical pickup having a focus actuator and an objective lens drivable by the focus actuator for irradiating the optical beam onto the optical disk through the objective lens;

an oscillation signal generator that generates an oscillation signal while the optical disk is being rotated to oscillate the objective lens in an optical-axis direction thereof so that a focus point of the optical beam recurrently passes through the target layer; and a controller that controls the optical pickup to form a recording spot on the target layer each time the focus point of the optical beam passes through the target layer so that a visible light property of the target layer is changed to thereby form the visible image on the target layer, wherein the controller applies to the focus actuator a driving signal comprising a first signal and the oscillating signal superimposed to the first signal, wherein the first signal is one of a DC signal or a varying amplitude signal, wherein the DC signal has a predetermined DC level effective to cause the focus point to position around the target layer during the rotation of the optical disk, and wherein the varying amplitude signal has a varying amplitude effective to cause the focus point to follow level swinging of the target layer during the rotation of the optical disk.

12. The apparatus according to claim 11, wherein the driving signal is applied to the focus actuator while the visible image is being drawn on the target layer.

13. The apparatus according to claim 12, further including a servo controller that provides a focusing servo control and a tracking servo control of the optical pickup, wherein both the focusing servo control and the tracking servo control are stopped while the driving signal is applied to the focus actuator.

14. The apparatus according to claim 11, wherein the target layer is a data recording layer on which the visible image is formable.

15. The apparatus according to claim 11, wherein the target layer is on a label side of the optical disk, opposite to a data recording side of the optical disk.

16. The apparatus according to claim 15, wherein the target layer on the label side is one of a photosensitive layer or a heat-sensitive layer.

17. A method of controlling an optical pickup having a focus actuator and an objective lens drivable by the focus actuator for irradiating an optical beam onto an optical disk through the objective lens, the optical disk having a target layer on which a visible image is formable, the method comprising the steps of:

rotating the optical disk; and applying to the focus actuator while the optical disk is being rotated, a driving signal comprising a first signal and an oscillation signal superimposed to the first signal, wherein the first signal is one of a DC signal or a varying amplitude signal, wherein the DC signal has a predetermined DC level effective to cause a focus point of the optical beam to position around the target layer during the rotation of the optical disk, wherein the varying amplitude signal has a varying amplitude effective to cause the focus point to follow level swinging of the target layer during the rotation of the optical disk, and wherein the oscillation signal is for oscillating the objective lens along an optical-axis direction thereof so that the focus point recurrently passes through the target layer of the optical disk.

18. The method according to claim 17, wherein the driving signal is applied to the focus actuator while the visible image is being drawn on the target layer.

19. The method according to claim 18, wherein a focusing servo control and a tracking servo control are provided for the optical pickup to accurately control the position of the focus point of the optical beam relative to the optical disk, and wherein both the focusing servo control and the tracking servo control of the optical pickup are stopped while the driving signal is applied to the focus actuator.

20. The method according to claim 17, wherein the target layer is a data recording layer and the visible image is formable on the data recording layer.

21. The method according to claim 17, wherein the target layer is on a label side of the optical disk, opposite to a data recording side of the optical disk.

22. The method according to claim 21, wherein the target layer on the label side is one of a photosensitive layer or a heat-sensitive layer.

23. An optical disk recording apparatus for an optical disk having a target layer on which a visible image is formable with an optical beam, the apparatus comprising:

an optical pickup having a focus actuator and an objective lens drivable by the focus actuator for irradiating the optical beam onto the optical disk through the objective lens; and a controller for applying a driving signal to the focus actuator while the optical disk is being rotated, wherein the driving signal comprises a first signal and an oscillation signal superimposed to the first signal, wherein the first signal is one of a DC signal or a varying amplitude signal, wherein the DC signal has a predetermined DC level effective to cause a focus point of the optical beam to position around the target layer during the rotation of the optical disk, wherein the varying amplitude signal has a varying amplitude effective to cause the focus point to follow level swinging of the target layer during the rotation of the optical disk, and wherein the oscillation signal is for oscillating the objective lens along an optical-axis direction thereof so that the focus point recurrently passes through the target layer of the optical disk.

24. The apparatus according to claim 23, wherein the driving signal is applied to the focus actuator while the visible image is being drawn on the target layer.

25. The apparatus according to claim 24, further including a servo controller that provides a focusing servo control and a tracking servo control of the optical pickup to accurately control the position of the focus point of the optical beam relative to the optical disk, and wherein both the focusing servo control and the tracking servo control of the optical pickup are stopped while the driving signal is applied to the focus actuator.

26. The apparatus according to claim 23, wherein the target layer is a data recording layer and the visible image is formable on the data recording layer.

27. The apparatus according to claim 23, wherein the target layer is on a label side of the optical disk, opposite to a data recording side of the optical disk.

28. The apparatus according to claim 27, wherein the target layer on the label side is one of a photosensitive layer or a heat-sensitive layer.

* * * * *